United States Patent [19]

Ballyns

[11] Patent Number: 5,635,691

[45] Date of Patent: Jun. 3, 1997

[54] PNEUMATIC PRESSURE SENSOR SWITCH DEVICE FOR A VEHICLE TIRE

[76] Inventor: Jan Ballyns, 1125 Meadowlane Crescent, Pickering, Ontario, Canada, L1X 1E5

[21] Appl. No.: 533,286

[22] Filed: Sep. 25, 1995

[51] Int. Cl.$^6$ ................................................. H01C 10/34
[52] U.S. Cl. ................... 200/61.25; 73/146.5; 200/83 Y; 340/442
[58] Field of Search ............................ 152/418; 340/611, 340/626, 443, 442; 73/717, 723, 146.5; 200/61.22, 61.25, 61.26, 81 R, 81.4, 81.5, 83 R, 83 A, 83 J, 83 N, 83 Y

[56] References Cited

U.S. PATENT DOCUMENTS

| | | | |
|---|---|---|---|
| 3,938,076 | 2/1976 | Hayashi | 200/61.25 |
| 4,048,614 | 9/1977 | Shumway | 340/58 |
| 5,040,562 | 8/1991 | Achterholt | 137/227 |
| 5,289,161 | 2/1994 | Huang | 340/447 |
| 5,325,901 | 7/1994 | Olney | 152/418 |

*Primary Examiner*—Gerald P. Tolin
*Attorney, Agent, or Firm*—Young & Thompson

[57] ABSTRACT

A pneumatic sensor switch for giving a warning signal if a pneumatic vehicle tire has too low pressure has a gas-filled chamber, separated from the inflation space in the tire by a flexible diaphragm cooperating electrically with a metal part in the chamber to form an electric switch open at safe pressures in the tire and closed at dangerous lower pressures. There is an electric circuit with battery and transmitter to transmit warning signals to the outside if the switch is closed. There may be a second chamber with an electric switch contact, filled with gas at a lower pressure and also separated from the inflation space in the tire by a flexible diaphragm so that the contact is open at atmospheric pressure therein and closed by the diaphragm at higher pressures. The electric switches of both chambers are connected in series so that a warning signal is given only at pressures in the dangerous range, when both switches are closed, and not at atmospheric pressure nor at safe operating pressures in the tire.

15 Claims, 2 Drawing Sheets

PNEUMATIC PRESSURE SENSOR SWITCH DEVICE FOR A VEHICLE TIRE

FIELD OF THE INVENTION

This invention relates to a pneumatic pressure sensor switch device for a pneumatic tire, with means for mounting it in the inflation chamber of the tire.

PRIOR ART

Such devices are known, e.g. from U.S. Pat. No. 4,048,614 Shumway. Therein a pressure detector and radio transmitter system for providing a tire pressure warning are shown. A flexible diaphragm senses the pressure in the inflation chamber of the tire acting thereon, there being an adjustable helical spring acting on the opposite surface of the diaphragm. If the pressure in the tire falls below a predetermined value, the diaphragm moves to a position in which two electric contacts contact each other, so that an electric circuit is closed to generate a signal, which is transmitted to the driver's cabin to give an alarm, which may be audible, visible or both.

SUMMARY OF INVENTION

The present invention aims at improving such pressure sensing and alarm devices to obtain a minimal loss of electric power, the least possible influence of temperature on the warning operation and a reliable operation with a device of simple construction.

To this end such a pneumatic pressure sensor switch device for a pneumatic tire, with means for mounting it in the inflation chamber of the tire, includes a sensor having a closed chamber filled with gas at a pressure above atmospheric pressure, one of the walls of the chamber being a flexible diaphragm, of which the surface remote from the chamber is exposed to the pressure in the inflation chamber of the tire, there being a movable electric switch contact point cooperating with a stationary switch contact point on the chamber, said movable contact point being provided on a movable part cooperating with the diaphragm so that the diaphragm moves said contact point out of contact with said stationary contact point at safe pressures in the tire and allows said contact points to make electrical contact at lower pressures in the tire, said sensor being taken up in an electric circuit with means to take up a source of electric energy and a transmitter to give radio signals to the outside of the tire when said circuit is closed.

In this way it is simply and reliably obtained that the switch device can be made small and reliable in operation and can be provided with thin walls, mainly of metal, so that the gas in the chamber rapidly takes up the temperature of the air in the inflation space of the tire, thus giving an automatic temperature compensation for normal variations of the temperature within the tire, as the gas in the chamber will vary in pressure proportional to the variation of pressure by temperature changes in the tire. This will be more fully obtained if the pressure in the chamber is close to normal operating pressures in the tire, although deviations, taking e.g. into account the resiliency of the diaphragm, are possible, depending also on the amount to which the tire pressure is allowed to drop before a warning signal is required. The gas pressure in the closed chamber is and should be the main parameter and contributor to the trip point at which a signal is given.

The closed chamber protects the electric contacts against fouling. Preferably, this chamber is filled with an inert gas such as nitrogen or argon.

In a preferred embodiment of this invention there is also a second sensor with a closed second chamber filled with gas at a lower pressure than the pressure in the other chamber, said second chamber having a (second) flexible diaphragm as one of its walls, exposed to the pressure in the inflation chamber of the tire, said diaphragm carrying an electric contact point cooperating electrically with a fixed contact point in this second sensor so that the said contact points are out of contact at atmospheric pressure in the tire and are in contact by movement of the diaphragm at higher pressures in the tire, this second sensor being connected with its contact points in series in the said electric circuit of the first-said sensor. Thereby, the circuit is open at atmospheric ambient pressures, as also during manufacture, assembly, shipping and storage of the device with the battery included, to avoid loss of energy and depletion of the battery.

Such a second sensor may also be used together with a sensor reacting to higher pressures in the tire but of a different design, according to the prior art as mentioned above, also of course to avoid loss of energy and transmitting of alarm signals during storage, shipping and mounting.

Such sensors may be mounted separately on a PC-board with an electric lead between them, but it is preferred to connect the two closed chambers so that they lie side by side with a separating wall between them, the flexible diaphragms bordering said combined device one at each side, This gives a very small device, easily mounted in the tips e.g. on a PC-board attached to the wheel rim.

FURTHER EMBODIMENT

The invention will now be described in more detail with reference to the enclosed drawings, in which.

Figure 1:
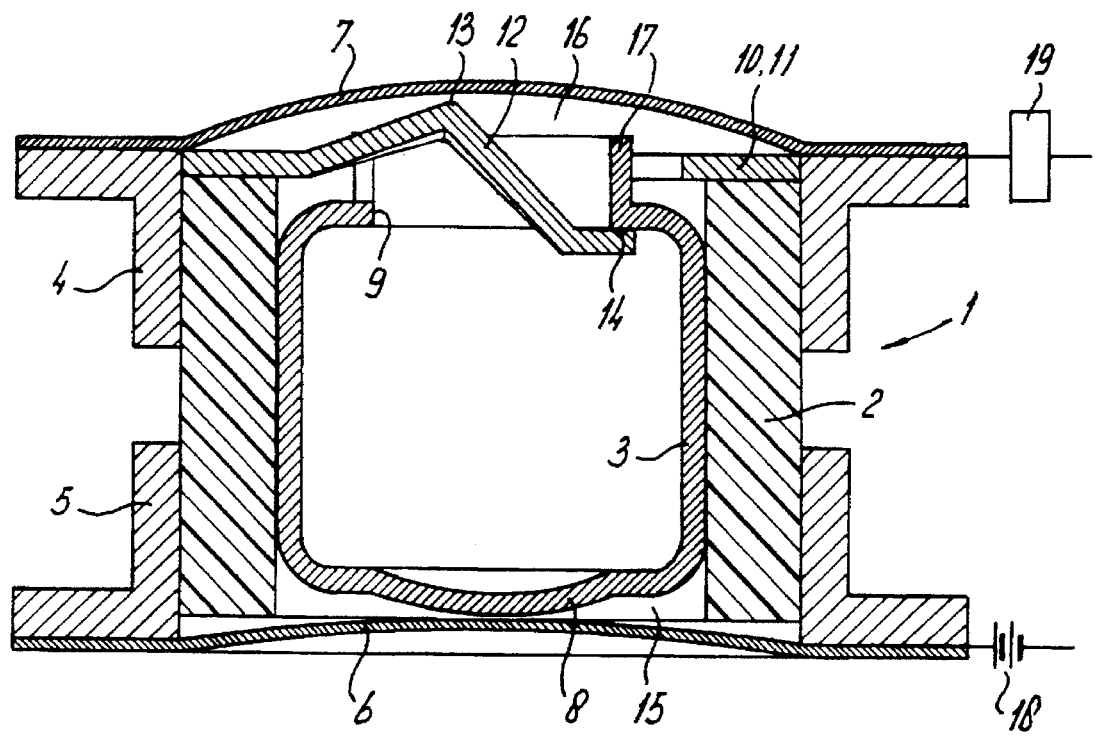
FIG. 1 is a section through the axis of a pressure sensor in a preferred embodiment of the invention.

The sensor 1 of FIG. 1 is essentially circular in shape. It has an annular body 2 of electrically non-conductive and gas-impermeable material such as Perspex® or Plexiglass®, a transparent resin of polymethylmetacrylate.

A chamber 3 of metal such as a copper alloy or a stainless steel is pressed with a gas-tight fit into the annular body 2. At both sides of body 2 a flanged ring 4, 5 of metal is tightly connected thereto and secured to the flange of each ring 4, 5 as by soldering or welding is a diaphragm 6, 7. A first one of these diaphragms, diaphragm 6 is, also in unloaded condition, curved so as to be concave at the outside. The opposite (other) diaphragm 7 is curved oppositely, i.e. so as to be convex at the outside. The diaphragms have some inherent resiliency to vary their position gradually with variations in pressure differences of the gas on both sides thereof, at least in a range of pressure differences, for which the sensor should be operative.

The chamber 3 has in the center of its bottom, as seen in FIG. 1, a somewhat dome-shaped part 8, acting as an electric contact cooperating with diaphragm 6. It is just out of contact with diaphragm 6 at atmospheric ambient pressures. In its top surface, as seen in FIG. 1, this chamber 3 has an opening 9. Between body 2 and diaphragm 7 a spring contact 10 is provided, also FIG. 3, This has an outer annulus 11, fixed between body 2, ring 4 and diaphragm 7 so as to be in electric contact therewith, and a spring contact arm 12 bent out of the plane of annulus 11 in a way which is clearly shown in FIG. 1 and so as to have an elbow 13 positioned close to the center of diaphragm 7, vide also FIG. 3. This contact 10 is of a resilient metal, e.g. as usual for small disk or leaf springs. In its unloaded condition the arm 12 contacts the edge of opening 9 of chamber 3 at 14.

In this way there are formed two spaces 15 and 16 in this sensor, both gas tight. Space 15 is filled with a gas of low pressure, which may range from vacuum to somewhat above atmospheric, but preferably its pressure is about atmospheric.

Preferably it is filled with an inert gas such as nitrogen or argon. This has the advantage of avoiding corrosion of the electric contact parts. With some pressure in it, it tends less to leakage into it than full vacuum would do.

Space 16 is filled with gas, preferably the same gas as space 15, at a much higher pressure, in the range of the normal inflation pressure in the tire and preferably not lower than two thirds of this pressure.

The chamber 3 may have an upstanding edge part 17, with which diaphragm 7 enters into contact if the tire would be inflated to too high a pressure.

Diaphragm 6 is electrically connected to a circuit including a battery 18 and this circuit includes a radio transmitter 19 and is electrically connected to diaphragm 7.

Figure 2:
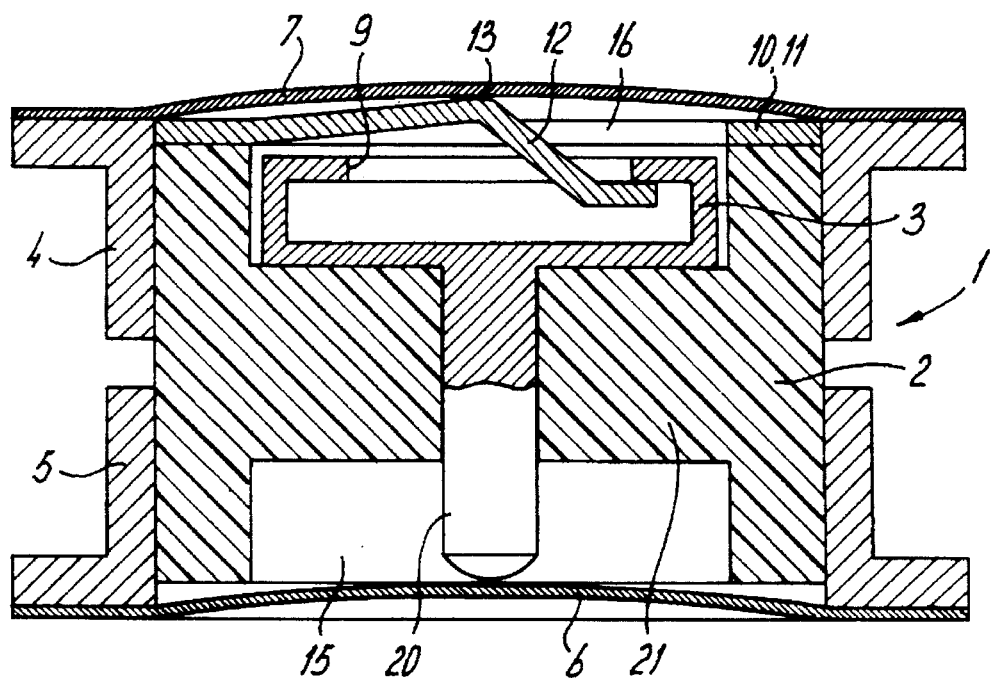
FIG. 2 is a similar section of such a pressure sensor in a somewhat different embodiment.

FIG. 2 shows such a sensor in a somewhat different embodiment. The chamber 3 differs from the one of FIG. 1 in that it is more shallow, its bottom having a pin-shaped part 20. The bottom of which replaces the dome-shaped part 8 of FIG. 1. This part 20 is surrounded by and securely housed in the transparent mass of body 2 as shown, in which body 2 space 15 is recessed.

Figure 3:
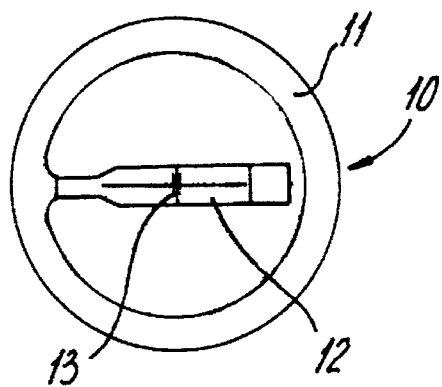
FIG. 3 is an axial view of a detail both of FIG. 1 and of FIG. 2.

FIG. 3 is a view of spring contact 10 as described above and as applied both in FIG. 1 and in FIG. 2.

As stated, some resiliency is provided for the diaphragms 6 and 7, and this is preferably not provided by separate spring means but inherent in the material such as metal of the diaphragms, so as not to spoil the temperature compensation effect.

The operation of the sensor device of FIG. 1 and 3 is as follows. At atmospheric ambient pressure, e.g. in storage or on a vehicle wheel with the tire removed or not inflated, diaphragm 6 will not contact dome-shaped part 8 of chamber 3, so that no electric current can flow from battery 18 to casing 3, diaphragm 7 and transmitter 19.

If the tire is inflated, diaphragm 6 will be depressed to contact part 8 of chamber 3, so that current flows via spring-contact 10, 11 (at 14) to diaphragm 6 and so to the transmitter 19. This will thus transmit signals to a well-known receiver outside the tire, e.g. in the driver's cabin, where it will give an audible and/or visual signal to the driver.

On further inflating the tire to a safe operating pressure, diaphragm 7 will be further depressed until it contacts the top 13 of the bent-out spring contact arm 12 and it will then depress this arm so that contact at 14 between arm 12 and casing 3 around opening 9 is broken. The transmitter 19 is thus deactivated and no signal is given to the driver.

If the pressure in the tire becomes too high, e.g. by careless continued inflating, diaphragm 7 will contact upstanding edge part 17, so that the electric circuit is again closed and a signal is given by the transmitter.

This means that, at safe operating pressures, there is contact between diaphragm 6 and part 8 of casing 5, but no signal is given as spring contact 12 is out of contact with casing 3 at 14, that no signal is given at atmospheric pressure because contact between 6 and 8 is broken, and that a signal is given at intermediate pressures in the tire, which are at a hazardous low value, and also at too high inflation pressures.

In FIG. 2 the operation is essentially the same, but in this case the spring contact 12 will reach the bottom of chamber 3, which here is rather shallow, if the tire is inflated too much, well above normal operating pressures. Thus the electric circuit will be closed, causing a warning signal to be sent by the transmitter 19.

Figure 4:
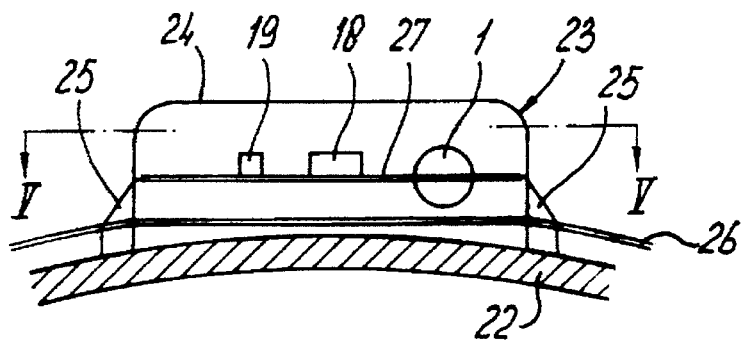
FIG. 4 is a section through the device carrying such a sensor, somewhat diagrammatically.
Figure 5:
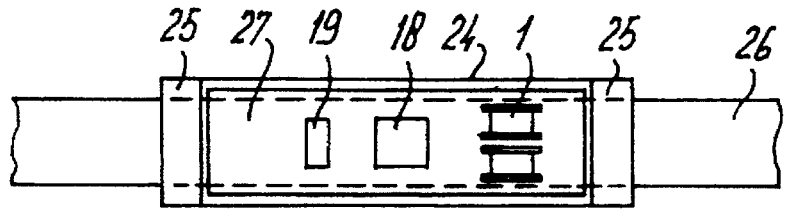
FIG. 5 is a section and view along the line V—V in FIG. 4, also shown only diagrammatically.

FIGS. 4 and 5 show one way of mounting of such sensors to the remainder of the switch device and of this device to a vehicle wheel. In FIG. 4, 22 is part of a rim of a vehicle wheel. The sensor switch device 23 includes a housing 24 of plastic material, having at each end a bracket 25 with a slot, through which can pass a thin steel strap 26 so as to keep housing 24 fixedly mounted to the wheel. The strap 26 has the usual means to be kept closed and under some tension, such as a suitable buckle not shown.

In the housing 24 there is mounted a PC-board 27 carrying in the usual way the electric parts and printed electric leads of the device, These include the sensor 1, battery 18 and transmitter 19, the leads between them not being shown. FIG. 5 shows that there are two such sensors 1 side by side. They may be mounted on the PC-board 27 by making H-shaped holes therein, so that the sensors can easily be connected both mechanically to the PC-board and electrically to the relevant electric leads and other parts thereof. The two sensors 1 may be identical in shade and dimensions, but filled with gas in their chambers 16 of mutually different pressures, so that e.g. a visible signal is generated at too low but not yet dangerous pressures in the tire, whereas the other sensor causes an audible signal to be given at a lower pressure in the tire, which is more dangerous. There may even be three of such sensors reacting to different pressures in the tire, of which e.g. one obtains a closed electric circuit at a pressure drop by about 10% from the normal tire pressure, to give a first warning signal, the second one obtaining this situation at a pressure drop of 20% and the third one of about 30%.

In a way known as such there may be a receiver in or at the driver's cabin with means to give an audible and/or visible signal if the transmitter 19 emits signals representing a warning about the pressure condition in the tire.

There may of course also be further means to protect the tire, e.g. means to turn on the same or a separate alarm by a temperature sensor at too high temperatures in the tire.

What I claim is:

1. A pneumatic pressure sensor switch device for a pneumatic tire, comprising means in addition to said switch device for mounting said switch device inside the inflation chamber of the tire, a sensor having a closed chamber filled with gas at a pressure above atmospheric pressure, one of the walls of the chamber being a flexible diaphragm, of which the surface remote from the chamber is exposed to the pressure in the inflation chamber of the tire, a movable electric switch contact point cooperating with a stationary switch contact point on the chamber, said movable contact point being provided on a movable part cooperating with the diaphragm so that the diaphragm moves said contact point out of contact with said stationary contact point at predetermined pressures in the tire and allows said contact points to make electrical contact at lower pressures in the tire, said sensor being taken up in an electric circuit with means to take up a source of electric energy and a transmitter to give radio signals to the outside of the tire when said circuit is closed.

2. A switch device according to claim 1, in which a wall of the closed chamber is made of electrically conductive material, so as to constitute itself directly the switch contact point cooperating with the switch contact point moved by its flexible diaphragm, said wall having an opening into which the said movable switch contact point, embodied as a spring contact, reaches, so that the spring contact is in electrical contact with said chamber wall at all pressures in the tire below the safe inflation pressure of the tire, which safe pressure deflects the diaphragm of this chamber so that it pushes the spring contact farther into the chamber out of electrical contact with said chamber wall.

3. A switch device according to claim 2, in which said spring contact extends from a peripheral part of the chamber and has a part between its ends and near the center of the diaphragm, which is bent so as to form a protrusion extending towards the diaphragm, so that at said predetermined operating pressures in the tire the diaphragm pushes onto the protrusion to keep the free end of the spring contact out of contact with the said chamber wall.

4. A switch device according to claim 1, in which the closed chamber has another stationary switch contact point so that said switch contact moved by said diaphragm away from said stationary switch contact point will reach said other stationary switch contact point to close the electric circuit at outside pressures on said diaphragm higher than said predetermined pressures in the tire.

5. A switch device according to claim 1, said diaphragm being electrically conductive, and in which the closed chamber has stationary electrical contact means, so that the electrically conductive diaphragm itself contacts these means to close the electric circuit at outside pressures on the diaphragm higher than said predetermined pressures in the tire.

6. A switch device according to claim 1, in which the gas pressure in the closed chamber is at most one third lower than the normal operating pressure in the tire.

7. A switch device according to claim 1, in which the said sensors are identical in shape and dimensions and have different gas pressures in the closed chamber.

8. A switch device according to claim 1, in which the only restoring force determining the position of the diaphragm at certain gas pressure differences to both sides thereof is the inherent resiliency of the diaphragm.

9. A pneumatic pressure sensor switch device for a pneumatic tire, comprising means for mounting said switch device inside the inflation chamber of the tire, two chambers, each having a flexible diaphragm as one of its walls, which diaphragms are, on their opposite surface, exposed to the pneumatic pressure in the inflation chamber of the tire, both chambers having electrical contact means operated by their diaphragm and electrically connected in series and to a transmitter to generate signals to be received outside the tire if an electric circuit through the transmitter is closed by both diaphragms, in which one of the chambers is filled with gas at a pressure much lower than the normal pressures in the inflation chamber of the tire, the electrical contact means in this chamber being open at atmospheric pressure on the outside of its diaphragm and being closed by movement of said diaphragm at higher pressures thereon.

10. A pneumatic pressure sensor switch device for a pneumatic tire, comprising means for mounting said switch device inside the inflation chamber of the tire, a sensor having a closed chamber filled with gas at a pressure above atmospheric pressure, one of the walls of the chamber being a flexible diaphragm, of which the surface remote from the chamber is exposed to the pressure in the inflation chamber of the tire, a movable electric switch contact point cooperating with a stationary switch contact point on the chamber, said movable contact point being provided on a movable part cooperating with the diaphragm so that the diaphragm moves said contact point out of contact with said stationary contact point at predetermined pressures in the tire and allows said contact points to make electrical contact at lower pressures in the tire, said sensor being taken up in an electric circuit with means to take up a source of electric energy and a transmitter to give radio signals to the outside of the tire when said circuit is closed, there being also a second sensor with a closed second chamber filled with gas at a lower pressure than the pressure in the other chamber, said second chamber having a second flexible diaphragm as one of its walls, exposed to the pressure in the inflation chamber of the tire, said second diaphragm carrying an electric contact point cooperating electrically with a fixed contact point in this second sensor so that the said contact points are out of contact at atmospheric pressure in the tire and are in contact by movement of the diaphragm at higher pressures in the tire, this second sensor being connected with its contact points in series in the said electric circuit of the first-said sensor.

11. A switch device according to claim 10, in which the two closed chambers are connected so that they lie side by side with a separating wall between them, the said flexible diaphragms bordering said combined device one at each side.

12. A switch device according to claim 11, in which an electrically insulating annulus surrounds a metal casing forming the greater part of the wall of the closed chamber with the highest pressure, the space between one of said diaphragms and said casing constituting the closed chamber with the lowest pressure.

13. A switch device according to claim 10, in which both chambers are filled by an inert gas.

14. A switch device according to claim 10, in which at least one of the diaphragms is made of electrically conductive material.

15. A switch device according to claim 10, in which the wall of a metal casing forming the greater part of the wall of the closed chamber with the highest pressure, bordering the chamber with the lower pressure, is bulged out towards the diaphragm of this low-pressure chamber to form the electrical contact cooperating therewith.

* * * * *